United States Patent
Loiler

(10) Patent No.: US 9,317,094 B2
(45) Date of Patent: Apr. 19, 2016

(54) DISTRIBUTED POWER DELIVERY TO A PROCESSING UNIT

(71) Applicant: NVIDIA CORPORATION, Santa Clara, CA (US)

(72) Inventor: Brian Roger Loiler, Santa Cruz, CA (US)

(73) Assignee: NVIDIA Corporation, Santa Clara, CA (US)

( * ) Notice: Subject to any disclaimer, the term of this patent is extended or adjusted under 35 U.S.C. 154(b) by 134 days.

(21) Appl. No.: 13/730,073

(22) Filed: Dec. 28, 2012

(65) Prior Publication Data

US 2014/0189375 A1 Jul. 3, 2014

(51) Int. Cl.
*G06F 1/32* (2006.01)
*G06F 1/26* (2006.01)

(52) U.S. Cl.
CPC . *G06F 1/32* (2013.01); *G06F 1/263* (2013.01)

(58) Field of Classification Search
CPC .................................. G06F 1/32; G06F 1/263
USPC ........................................................ 713/300
See application file for complete search history.

(56) References Cited

U.S. PATENT DOCUMENTS

| | | | |
|---|---|---|---|
| 4,618,779 A * | 10/1986 | Wiscombe | 307/60 |
| 4,748,340 A * | 5/1988 | Schmidt | 307/53 |
| 6,204,720 B1 * | 3/2001 | Gray | 327/513 |
| 7,312,962 B1 * | 12/2007 | Zansky et al. | 361/30 |
| 8,232,683 B2 * | 7/2012 | Garb | 307/116 |
| 8,283,804 B2 * | 10/2012 | Kim et al. | 307/44 |
| 2005/0028017 A1 * | 2/2005 | Janakiraman et al. | 713/340 |
| 2006/0007614 A1 * | 1/2006 | Pozzuoli et al. | 361/62 |
| 2006/0108989 A1 * | 5/2006 | Koertzen | 323/265 |
| 2007/0046281 A1 * | 3/2007 | Domingo et al. | 324/142 |
| 2010/0001708 A1 * | 1/2010 | Dobkin | 323/304 |
| 2010/0264893 A1 * | 10/2010 | Li | 323/282 |
| 2011/0001359 A1 * | 1/2011 | Moon et al. | 307/43 |
| 2011/0205769 A1 * | 8/2011 | Blackwell et al. | 363/65 |
| 2013/0171843 A1 * | 7/2013 | Barnette et al. | 439/70 |

FOREIGN PATENT DOCUMENTS

TW 200903245 A 1/2009

* cited by examiner

*Primary Examiner* — Vincent Tran
(74) *Attorney, Agent, or Firm* — Artegis Law Group, LLP

(57) ABSTRACT

Technology is provided for distributed power delivery to a processing unit on a printed circuit board. In one example, a printed circuit board includes a processing unit coupled to multiple power channels, including first channels on a first side of the processing unit, and second channels on a second side of the processing unit. The printed circuit board further includes a first power supply coupled to the processing unit via the first channels, and a second power supply coupled to the processing unit via the second channels. The processing unit is configured to receive a total current, including currents drawn substantially simultaneously from the first power supply and the second power supply. The total current is about equivalent to a current the processing unit would draw from a single power supply.

9 Claims, 5 Drawing Sheets

DISTRIBUTED POWER DELIVERY TO A PROCESSING UNIT

BACKGROUND OF THE INVENTION

1. Field of the Invention

The present invention generally relates to integrated circuits and, more specifically, to distributed power delivery to a processing unit on a printed circuit board.

2. Description of the Related Art

A processing unit and other circuitry on a printed circuit board consume and dissipate electric power. Examples of such a processing unit include, without limitation, a graphics processing unit (GPU) and a central processing unit (CPU). Other circuitry coupled to the processing unit includes, without limitation, electronic power channels that couple the processing unit to a power supply (e.g., battery) on the printed circuit board. A processing unit can consume electric power, for example, by switching devices (e.g., flip-flops, transistors, etc.) included within the processing unit. Such operations of a processing unit are naturally associated with a non-zero amount of wasted and/or dissipated electric power. For example, electric power demanded by a processing unit causes current to flow from the power supply, through the power channels, and to the processing unit. As the current is flowing through the power channels, the power channels naturally dissipate a non-zero amount of power in the form of heat due to the impedance (e.g., resistance, etc.) of the power channels. Thus, the dissipated heat amounts to wasted and/or dissipated electric power of the printed circuit board.

Different processing units consume and dissipate varying degrees of electric power. Some implementations of processing units use relatively little power. For example, a processing unit in a mobile phone may consume and dissipate just a few hundred milliwatts of electricity. A microcontroller of an embedded system may consume and dissipate a few milliwatts. In comparison, a processing unit in a general purpose personal computer, such as a desktop or a laptop, may consume and dissipate significantly more power because of the higher complexity and speed of a personal computer. Such a microelectronic processing unit may consume and dissipate power in the order of a few watts to hundreds of watts. Historically, early processing units implemented with vacuum tubes consumed power on the order of many kilowatts.

Regardless of the type of processing unit, designing a processing unit that performs processing tasks efficiently without overheating remains a primary design objective. In addition, physical designs of printed circuit boards oftentimes include a processing unit coupled to a single power supply on one side of the processing unit, even in cases where the single power supply delivers multiple phases of power. Unfortunately, in such designs (e.g., single power supply on one side of a processing unit), electric power is oftentimes unnecessarily dissipated.

As the foregoing illustrates, what is needed in the art is a more efficient approach for distributing power to electronic devices on a printed circuit board.

SUMMARY OF THE INVENTION

One implementation of the present technology sets forth a printed circuit board that includes a processing unit coupled to multiple power channels, including one or more first channels on a first side of the processing unit, and one or more second channels on a second side of the processing unit. The printed circuit board further includes a first power supply coupled to the processing unit via the first channels, and a second power supply coupled to the processing unit via the second channels. The processing unit is configured to receive a total current, including currents drawn substantially simultaneously from the first power supply and the second power supply. The total current is about equivalent to a current the processing unit would draw from a single power supply.

Advantageously, the disclosed approach improves efficiency of power delivery to a processing unit by physically distributing power phases around the processing unit. Accordingly, the present technology can help a manufacturer to reduce power that is dissipated in a printed circuit board. Reducing power dissipation enables, for example, a power supply (e.g., battery) to be more efficient and to provide energy to a processing unit over a longer period of time.

BRIEF DESCRIPTION OF THE DRAWINGS

So that the manner in which the above recited features of the present invention can be understood in detail, a more particular description of the invention, briefly summarized above, may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
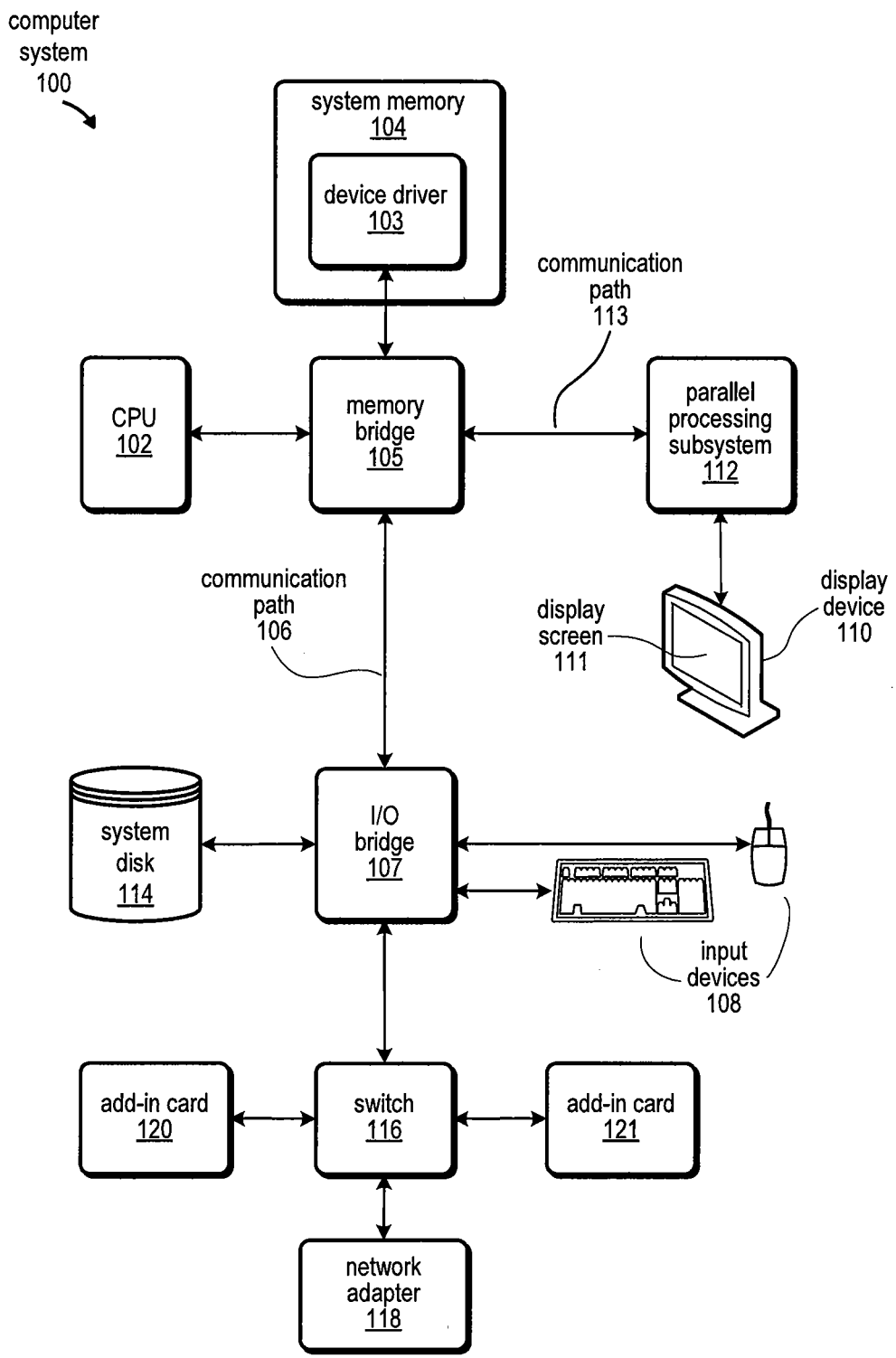
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point to point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add in cards or peripheral devices might be supported. In some embodiments, switch 116 is eliminated, and network adapter 118 and add in cards 120, 121 connect directly to I/O bridge 107.

Figure 2:
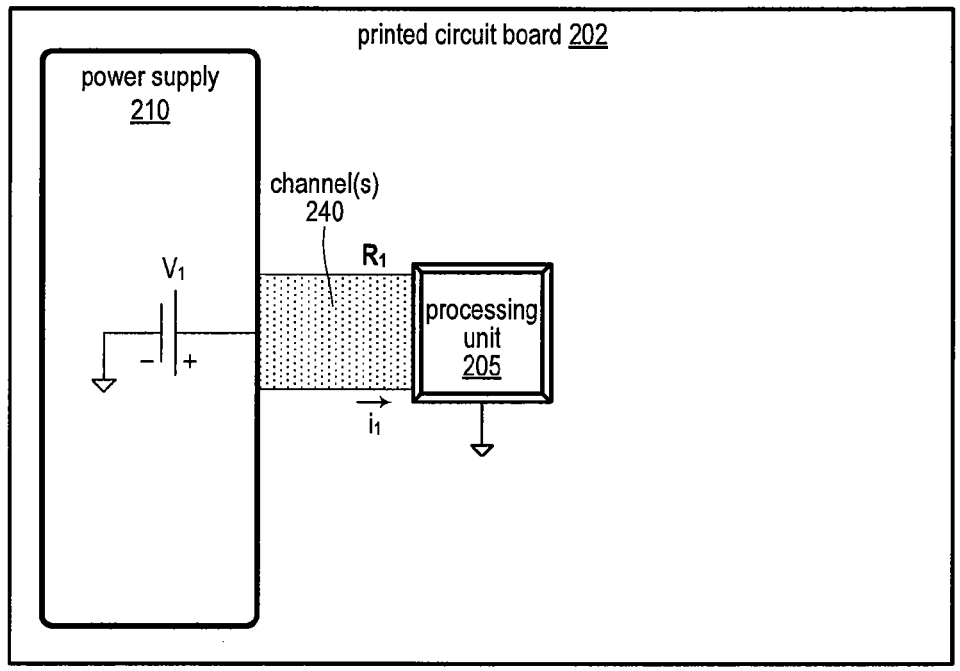
FIG. 2 is conceptual diagram of an example printed circuit.

FIG. 2 is conceptual diagram of an example printed circuit 202. A processing unit 205, a power supply 210, and power channels 240 are coupled to the printed circuit board 202. The processing unit 205 is coupled to the power supply 210 via the power channels 240. It will be appreciated that the printed circuit board 202 may include other circuitry (not shown), such as memory devices and another processing unit, among other devices. In one implementation, the printed circuit board 202 may be located on a mobile system, such as, for example, a cell phone, a laptop, a tablet computer, and/or a handheld gaming device, among other computer systems. In one implementation (not shown), the power supply 210 may be physically located at another side of the processing unit 205, instead of at the left side as shown in FIG. 2. Examples of a processing unit 202 include without limitation a graphics processing unit (GPU) and/or a central processing unit (CPU). An example of a power supply 210 includes without limitation a battery, such as, for example, a lithium ion battery, a lithium polymer battery, a nickel cadmium battery, a nick metal hydride battery, another type of rechargeable battery, and/or a non-rechargeable battery.

In the example of FIG. 2, the power supply 210 operates as a single power supply and is physically located on one side of the printed circuit board 202. The processing unit 202 operates as a single point load of the power supply 210. In one implementation, where the power supply 202 is configured to provide multi-phase power to the processing unit 205, all of the power phases delivered from the power supply 202 may be configured to travel through the power channels 240 to the processing unit 205. The power channels 240 broadly include any circuitry and devices that are involved with delivering power from the power supply 210 to the processing unit 205. In one implementation, the power channels 240 include conductive pathways, tracks and/or signal traces etched from copper sheets laminated onto a non-conductive substrate of the printed circuit board 202.

As current is flowing through the power channels 240, unfortunately, power is dissipated in the printed circuit board 202 and/or components of the printed circuit board 202, due to inherent impedance of the printed circuit board 202 and components thereof. For purposes of describing the present technology, impedance can be simplified down to resistance, which is the mathematically real part (as opposed to imaginary part) of impedance. For example, the power channels 240 have impedance that can be simplified as resistance $R_1$ through which a current $i_1$ flows. The power supply 210 operates at a voltage $V_1$. According to Ohm's law of proportionality in electronic circuits, the power dissipated in the printed circuit board 202 may be described according the following equation:

$$P_{dissipated} = i_1^2 R_1 \tag{1}$$

For example, if the processing unit 205 demands a total current $i_1$ to be 200 amps, and the resistance $R_1$ is 0.0002 ohms, then the power dissipated in the printed circuit board 202 is 8 watts ($200^2 \times 0.0002$). A manufacturer may like to reduce power dissipation as much as possible. Reducing power dissipation enables, for example, a power supply (e.g., battery) to be more efficient and to provide energy to a processing unit over a longer period of time. As further described below with reference to FIGS. 3-7, the present technology involves technology for reducing power dissipation in a printed circuit board by providing a distributed power supply.

Distributing Power Delivery to Improve Efficiency

Figure 3:
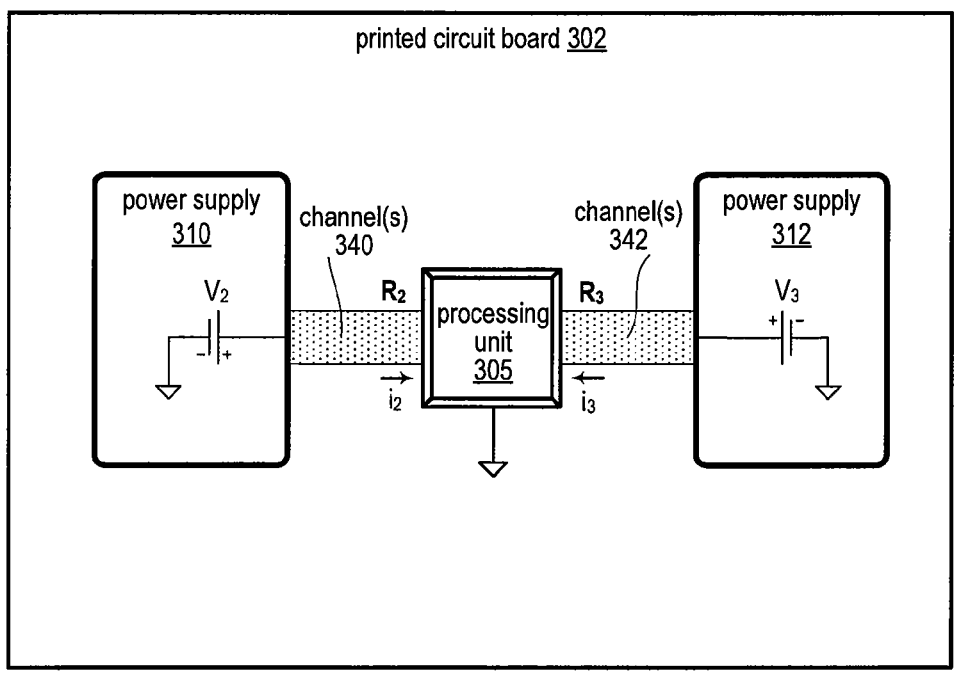
FIG. 3 is a conceptual diagram of an example printed circuit board having a power supply distributed among two different power supplies, according to one embodiment of the present invention.

FIG. 3 is a conceptual diagram of an example printed circuit board 302 having a power supply distributed among two different power supplies, according to one embodiment of the present invention. The printed circuit board 302 includes and/or is coupled to a processing unit 305, a power supply 310, a power supply 312, power channels 340, and power channels 342. The processing unit 305 is coupled to the power supply 310 via the power channels 340. The processing unit 305 is also coupled to the power supply 312 via the power channels 342. Accordingly, in some implementations, the printed circuit board 302 may be configured to be like the printed circuit board 202 of FIG. 2, but with a power supply distributed among two power supplies. The system of FIG. 3 includes a distributed power source (e.g., power supplies 310 and 312) and a single point load (e.g., processing unit 305).

The power channels 340 have impedance that can be simplified as resistance $R_2$. The power channels 342 have impedance that can be simplified as resistance $R_3$. In one implementation of FIG. 3, the resistance $R_2$ and the resistance $R_3$ are each equal to about half of the resistance $R_1$ of FIG. 2. The power supply 310 provides a current $i_2$ and operates at a voltage $V_2$. The power supply 312 provides a current $i_3$ and operates at a voltage $V_3$. In one implementation, the current $i_2$ and the current $i_3$ are each equal to about half of the current $i_1$ of FIG. 2.

Each power supply (310, 312) may be positioned at any allowable physical location on the printed circuit board 302. For example, as shown in FIG. 3, the processing 305 may be configured with the power supplies 310 and 312 on opposite sides. In another example (not shown), the processing 305 may be configured with one power supply on first side of the processing unit 305, and another power supply on a second side that is about a physically orthogonal to the first side. Mechanical constraints limit the allowable configurations of the power supplies (310, 312). For example, physical locations and/or limitations of a device (e.g., memory device, conductive channel, power rail, CPU, GPU, etc.) may limit the allowable configurations of the power supplies (310, 312).

As described above with reference to FIG. 2, a power supply (e.g., multi-phase power supply) may have all the power phases on one side (e.g., left or right) of the processing unit 305, but not on two or more sides. Such a single power source means all the power delivered from the power supply to the processing unit travels through the power channels on either side of the processing unit, but not on more than one side.

In contrast, components of the printed circuit board 302 of FIG. 3 are configured to improve efficiency of power delivery to the processing unit 305 by physically distributing power phases around the processing unit 305. Components of the printed circuit board 302 distribute the power supply among two sides of the processing unit 305. For example, the components distribute a multiple-phase power supply needed for higher power GPUs allowing power delivery to flow left and right of the GPU substantially simultaneously.

In one implementation, the power delivered to the processing unit 305 may be distributed about evenly from the power supply 310 and the power supply 312. The processing unit 305 is a single point load. In one implementation, the total resistance ($R_2+R_3$) may be about the same as the resistance $R_1$ of the power channels 240 of FIG. 2. However, the total resistance ($R_2+R_3$) is divided among the power channels 340 and the power channels 342, respectively. In one implementation, the number of power channels required for a particular current flow is proportional to the amount of current flowing from a power supply. According to Ohm's law of proportionality in electronic circuits, the power dissipated in the printed circuit board 302 may be described according to the following equation:

$$P_{dissipated} = i_2^2 R_2 + i_3^2 R_3 \quad (2)$$

Using the specifications of the example of FIG. 2, assume the processing unit 305 of FIG. 3 is configured to demand a total current of 200 amps, and the total resistance is 0.0002 ohms. Accordingly, the current $i_2$ can be 100 Amps, and the current $i_3$ can be 100 Amps, adding up to the total demanded current of 200 amps. In this example, assume $V_2$ is about equal to $V_3$. The resistance $R_2$ and the resistance $R_3$ are each 0.0001 ohms adding up to the total resistance of 0.0002 ohms. Then, the power dissipated in the printed circuit board 302 is 2 watts ($100^2 \times 0.0001 + 100^2 \times 0.0001$). Compared to the analogous example of FIG. 2, the power dissipation is reduced from 8 watts to 2 watts, which is a 75% reduction.

Accordingly, the configuration of FIG. 3 reduces power dissipation in the printed circuit board 302 by distributing delivery of power phases among the power supplies (310, 312). As further described below with reference to FIG. 4, the amounts of power (e.g., current) delivered from each power supply (310, 312) may not be equal. However, as further described below with reference to FIG. 5, the system can minimize power dissipation when two or more power supplies distribute the delivery of power phases evenly among the power supplies.

Distributing Power Delivery Unevenly

Figure 4:
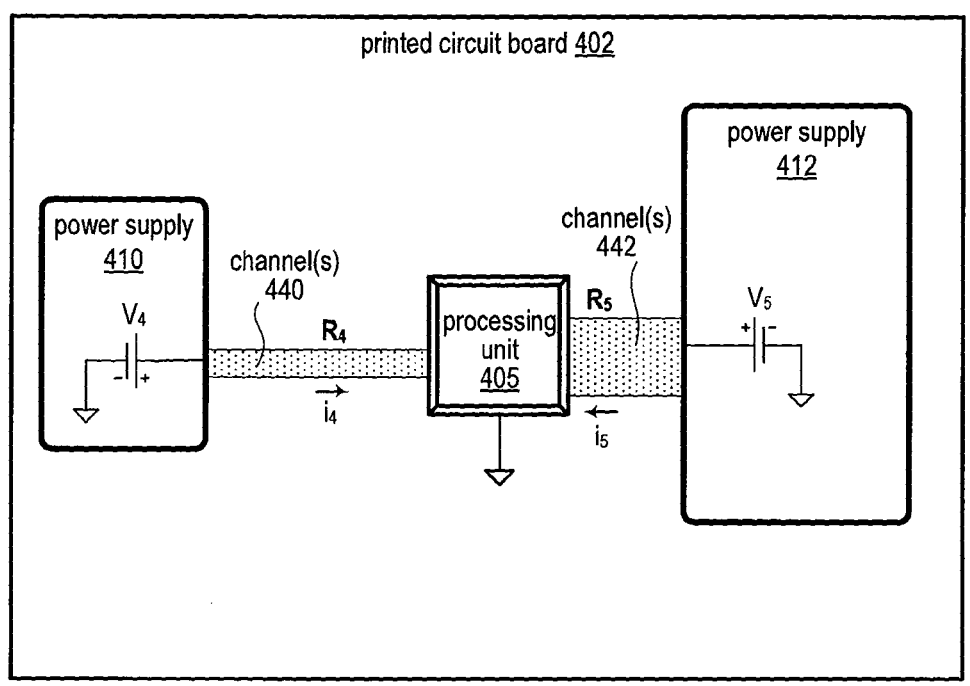
FIG. 4 is a conceptual diagram of an example printed circuit board having a power supply distributed among two different power supplies that may be uneven, according to one embodiment of the present invention.

FIG. 4 is a conceptual diagram of an example printed circuit board 402 having a power supply distributed among two different power supplies that may be uneven, according to one embodiment of the present invention. The printed circuit board 402 includes and/or is coupled to a processing unit 405, a power supply 410, a power supply 412, power channels 440, and power channels 442. The processing unit 405 is coupled to the power supply 410 via the power channels 440. The processing unit 405 is also coupled to the power supply 412 via the power channels 442. Accordingly, in some implementations, the printed circuit board 402 may be configured to be like the printed circuit board 202 of FIG. 2, but with a power supply distributed among two power supplies that may be uneven. The system of FIG. 4 includes a distributed power source (e.g., power supplies 410 and 412) and a single point load (e.g., processing unit 405).

The power channels 440 have impedance that can be simplified as resistance $R_4$. The power channels 442 have impedance that can be simplified as resistance $R_5$. In one implementation, the resistance $R_4$ and the resistance $R_5$ are unequal in magnitude, but have a sum that is about equal to the resistance $R_1$ of FIG. 2. The power supply 410 provides a current $i_4$ and operates at a voltage $V_4$. The power supply 412 provides a current $i_5$ and operates at a voltage $V_5$. In one implementation, the current $i_4$ and the current $i_5$ are unequal in magnitude, but have a sum that is about equal in magnitude to the current $i_1$ of FIG. 2.

Each power supply (410, 412) may be positioned at any allowable physical location on the printed circuit board 402. For example, as shown in FIG. 4, the processing 405 may be configured with the power supplies 410 and 412 on opposite sides. In another example (not shown), the processing 405 may be configured with one power supply on a first side of the processing unit 405, and another power supply on a second side that is about physically orthogonal side to the first side. Mechanical constraints limit the allowable configurations of the power supplies (410, 412). For example, physical locations and/or limitations of a device (e.g., memory device, conductive channel, power rail, CPU, GPU, etc.) may limit the allowable configurations of the power supplies (410, 412).

A purpose of FIG. 4 is to show in a diagram that the distributed power supplies (410, 412) do not necessarily have to be equivalents. For example, the size, the power capability, the current drawn, and/or the relative location are not necessarily equivalents. Components of the printed circuit board 402 are configured to improve power delivery efficiency from power supply to the processing unit 405 by distributing multiple power phases around the processing unit 405. Components of the printed circuit board 402 may distribute the power supply among two sides of the processing unit 405. In one implementation, the power delivered to the processing unit 405 may be distributed unevenly from the power supply 410 and the power supply 412. The processing unit 405 is a single point load. In one implementation, the total resistance ($R_4+R_5$) may be about the same as the resistance $R_1$ of the power channels 240 of FIG. 2. However, the total resistance ($R_4+R_5$) is divided among the power channels 440 and the power channels 442, respectively. In one implementation, the number of power channels required for a particular current flow is proportional to the amount of current flowing from a power supply.

Using the specifications of the example of FIG. 2, assume the processing unit 405 of FIG. 4 is configured to demand a total current of 200 amps, and the total resistance is 0.0002 ohms. Accordingly, the current $i_4$ can be 50 amps, and the current $i_5$ can be 150 amps, adding up to the total demanded current of 200 amps. In this example, assume $V_4$ is unequal to $V_5$. The resistance $R_4$ is about 0.00005 ohms, and the resistance $R_5$ is about 0.00015 ohms, adding up to the total resistance of 0.0002 ohms. Then, the power dissipated in the printed circuit board 402 is 3.5 watts ($50^2 \times 0.00005 + 150^2 \times 0.00015$). Compared to the analogous example of FIG. 2, the power dissipation is reduced from 8 watts to 3.5 watts, which is a 56.25% reduction.

Accordingly, even though the amounts of power (e.g., current) delivered from each power supply (410, 412) may be unequal in magnitude, the configuration of FIG. 4 still reduces power dissipation in the printed circuit board 402 by distributing delivery of power phases among the power supplies (410, 412). However, as further described below with reference to FIG. 5, the system can minimize power dissipation when two or more power supplies distribute the delivery of power phases evenly among the power supplies.

Minimizing Power Dissipation

Figure 5:
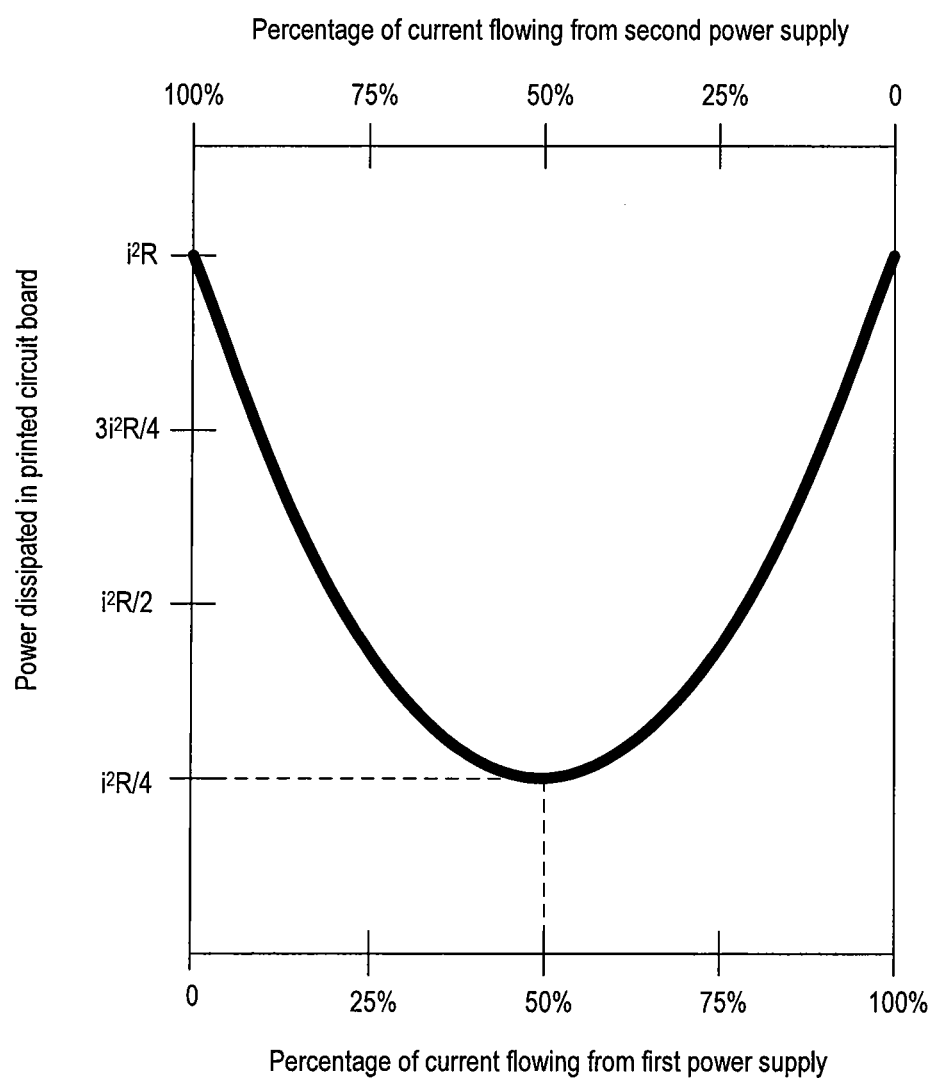
FIG. 5 is an example graph of distributed power delivery on a printed circuit board, according to one embodiment of the present invention.

FIG. 5 is an example graph 500 of distributed power delivery on a printed circuit board, according to one embodiment of the present invention. The Equation 2 described above can be modified to account for two power supplies that do not necessarily deliver an equal amount of power. In one implementation, the number of power channels required for a particular current flow is proportional to the amount of current flowing from a power supply. Also, the total resistance is divided among the power channels. Referring to FIG. 3, assume the current $i_2$ is a fraction k of a total current i demanded from the processing unit 305. Accordingly, the current $i_2$ can be described as ki, where $0 \le k \le 1$. Likewise, assume the resistance $R_2$ is also a fraction k of a total resistance R of the power channels (340, 342). Accordingly, the resistance $R_2$ can be described as kR. It follows that the current $i_3$ is a fraction (1−k) of the total current i demanded from the processing unit 305. Accordingly, the current $i_3$ can be described as (1−k)i. Likewise, assume the resistance $R_3$ is also a fraction (1−k) of the total resistance R. Accordingly, the resistance $R_3$ can be described as (1−k)R. Based on these assumptions, Equation 2 can be modified to the following equation:

$$P_{dissipated} = (ki)^2(kR) + [(1-k)i]^2(1-k)R, \text{ where } 0 \le k \le 1 \quad (3)$$

Equation 3 can be simplified to the following equation:

$$P_{dissipated} = i^2 R(3k^2 - 3k + 1), \text{where } 0 \le k \le 1 \quad (4)$$

Equation 4 describes power dissipated in a printed circuit board where power delivery is distributed among two power supplies, and where k is the fraction of the total current i flowing from the first power supply.

Referring to FIG. 5, the example graph 500 is a graphical representation of Equation 4. For example, when 100% of the current i flows from the first power supply and 0% of the current i flows from the second power supply (e.g., k=1), the power dissipated in the printed circuit board is about equal to $i^2R$. Likewise, when and 0% of the current i flows from the first power supply and 100% of the current i flows from the second power supply (e.g., k=0), the power dissipated in the printed circuit board is about equal to $i^2R$. When 25% of the current i flows from the first power supply and 75% of the current i flows from the second power supply (e.g., k=0.25), the power dissipated in the printed circuit board is about equal to $0.4375 \times i^2R$. Likewise, when 75% of the current i flows from the first power supply and 25% of the current i flows from the second power supply (e.g., k=0.75), the power dissipated in the printed circuit board is about equal to $0.4375 \times i^2R$, which is about a 56.25% reduction from $i^2R$. When 50% of the current i flows from the first power supply and 50% of the current i flows from the second power supply (e.g., k=0.5), the power dissipated in the printed circuit board is about equal to $i^2R/4$, which is about a 75% reduction from $i^2R$.

To reinforce this finding of reduced power dissipation, the derivative (e.g., the slope) of Equation 4 is equal to 0 when k=0.5. Accordingly, the derivative of Equation 4 shows that power dissipation is at a minimum point when k=0.5 (e.g., 50% power delivery from each power source). Equation 4 shows that a system can minimize power dissipation when two power supplies distribute power delivery evenly among the two power supplies. In another implementation, a system may distribute power delivery among three or more power supplies. Similar to the case of two distributed power supplies, as described above with reference to FIG. 5, the system can minimize power dissipation when the system distributes the power phases evenly among three or more power supplies.

Distributing Power Delivery Among Three or More Power Supplies

Figure 6:
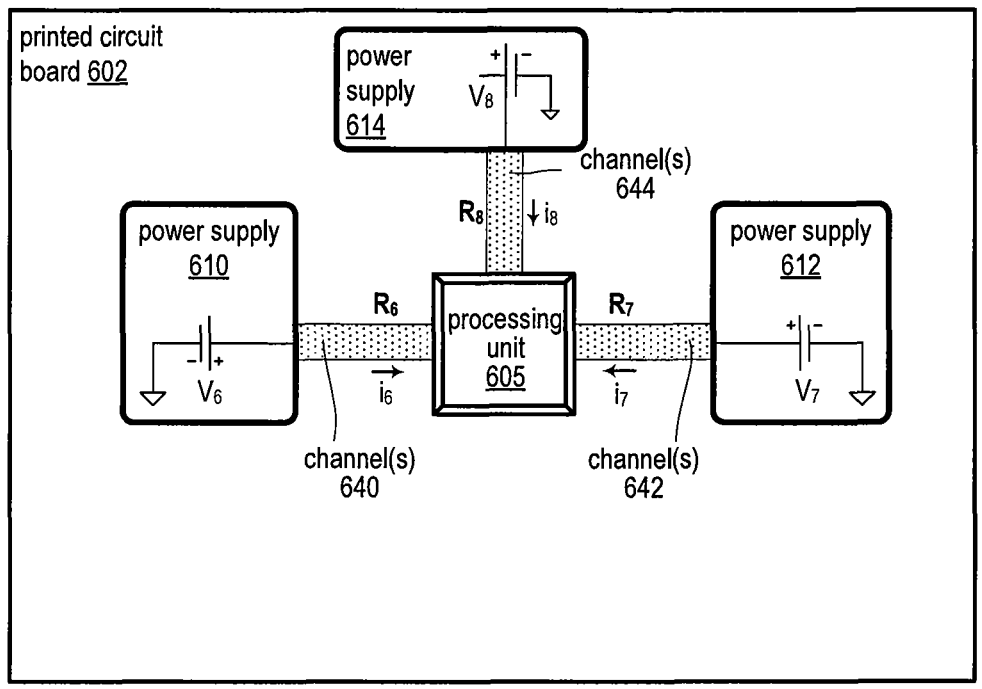
FIG. 6 is a conceptual diagram of an example printed circuit board having a power supply distributed among three different power supplies, according to one embodiment of the present invention.

FIG. 6 is a conceptual diagram of an example printed circuit board 602 having a power supply distributed among three different power supplies, according to one embodiment of the present invention. The printed circuit board 602 includes and/or is coupled to a processing unit 605, a power supply 610, a power supply 612, a power supply 614, power channels 640, power channels 642, and power channels 644. The processing unit 605 is coupled to the power supply 610 via the power channels 640. The processing unit 605 is also coupled to the power supply 612 via the power channels 642. The processing unit 605 is also coupled to the power supply 614 via the power channels 644. Accordingly, in some implementations, the printed circuit board 602 may be configured to be like the printed circuit board 202 of FIG. 2, but with a power supply distributed among three power supplies. The system includes a distributed power source (e.g., power supplies 610, 612, and 614) and a single point load (e.g., processing unit 605).

The power channels 640 have impedance that can be simplified as resistance $R_6$. The power channels 642 have impedance that can be simplified as resistance $R_7$. The power channels 644 have impedance that can be simplified as resistance $R_8$. In one implementation of FIG. 6, the resistance $R_6$, the resistance $R_7$, and the resistance $R_8$ are each equal to about one-third of the resistance $R_1$ of FIG. 2. In another implementation of FIG. 6, the resistance $R_6$, the resistance $R_7$, and the resistance $R_8$ are not necessarily equal in magnitude, but have a sum that is about equal to the resistance $R_1$ of FIG. 2. The power supply 610 provides a current $i_6$ and operates at a voltage $V_6$. The power supply 612 provides a current $i_7$ and operates at a voltage $V_7$. The power supply 614 provides a current $i_8$ and operates at a voltage $V_8$. In one implementation, the current $i_6$, the current $i_7$, and the current $i_8$ are each equal to about one-third of the current $i_1$ of FIG. 2. In another implementation of FIG. 6, the current $i_6$, the current $i_7$, and the current $i_8$ are not necessarily equal in magnitude, but have a sum that is about equal to the current $i_1$ of FIG. 2.

Each power supply (610, 612, 614) may be positioned at any allowable physical location on the printed circuit board 602. For example, as shown in FIG. 6, the processing 605 may be configured with the power supplies 610 and 612 on about physically opposite sides, and the power supply 614 on a third side. In another example (not shown), the processing 605 may be configured with two power supplies on a first side of the processing unit 605, and one power supply on a second side that is about physically opposite to the first side. Mechanical constraints limit the allowable configurations of the power supplies (610, 612, 614). For example, physical locations and/or limitations of a device (e.g., memory device, conductive channel, power rail, CPU, GPU, etc.) may limit the allowable configurations of the power supplies (610, 612, 614).

Figure 7:
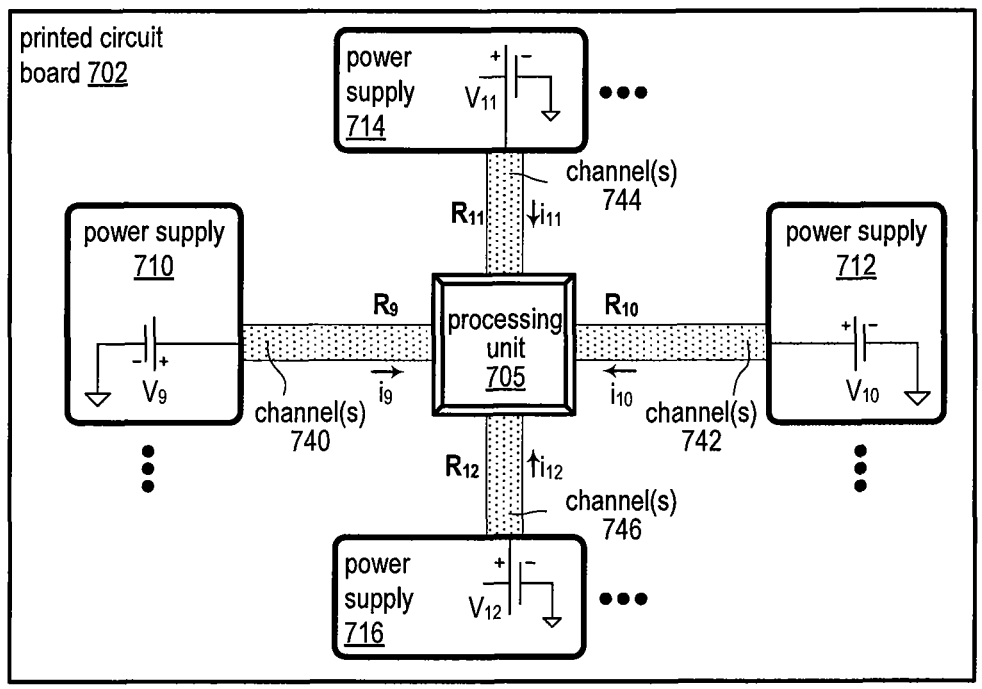
FIG. 7 is a conceptual diagram of an example printed circuit board having a power supply distributed among four different power supplies, according to one embodiment of the present invention.

FIG. 7 is a conceptual diagram of an example printed circuit board 702 having a power supply distributed among four different power supplies, according to one embodiment of the present invention. The printed circuit board 702 includes and/or is coupled to a processing unit 705, a power supply 710, a power supply 712, a power supply 714, a power supply 716, power channels 740, power channels 742, power channels 744, and power channels 746. The processing unit 705 is coupled to the power supply 710 via the power channels 740. The processing unit 705 is also coupled to the power supply 712 via the power channels 742. The processing unit 705 is also coupled to the power supply 714 via the power channels 744. The processing unit 705 is also coupled to the power supply 716 via the power channels 746. Accordingly, in some implementations, the printed circuit board 702 may be configured to be like the printed circuit board 202 of FIG. 2, but with a power supply distributed among three power supplies. The system of FIG. 7 includes a distributed power source (e.g., power supplies 710, 712, 714, and 612) and a single point load (e.g., processing unit 705).

The power channels 740 have impedance that can be simplified as resistance $R_9$. The power channels 742 have impedance that can be simplified as resistance $R_{10}$. The power channels 744 have impedance that can be simplified as resistance $R_{11}$. The power channels 746 have impedance that can be simplified as resistance $R_{12}$. In one implementation of FIG. 7, the resistance $R_9$, the resistance $R_{10}$, the resistance $R_{11}$, and the resistance $R_{12}$ are each equal to about one-fourth of the resistance $R_1$ of FIG. 2. In another implementation of FIG. 6, the resistance $R_9$, the resistance $R_{10}$, the resistance $R_{11}$, and the resistance $R_{12}$ are not necessarily equal in magnitude, but have a sum that is about equal to the resistance $R_1$ of FIG. 2. The power supply 710 provides a current $i_9$ and operates at a voltage $V_9$. The power supply 712 provides a current $i_{10}$ and operates at a voltage $V_{10}$. The power supply 714 provides a current $i_{11}$ and operates at a voltage $V_{11}$. The power supply 716 provides a current $i_{12}$ and operates at a voltage $V_{12}$. In one implementation, the current $i_9$, the current $i_{10}$, the current $i_{11}$, and the current $i_{12}$ are each equal to about one-fourth of the current $i_1$ of FIG. 2. In another implementation of FIG. 6, the current $i_9$, the current $i_{10}$, the current $i_{11}$, and the current $i_{12}$ are not necessarily equal in magnitude, but have a sum that is about equal to the current $i_1$ of FIG. 2.

Each power supply (710, 712, 714, 716) may be positioned at any allowable physical location on the printed circuit board 702. For example, as shown in FIG. 7, the processing 705 may be configured with the power supplies 710 and 712 on physically opposite sides, and the power supplies 714 and 716 on physically opposite sides. In another example (not shown), the processing 705 may be configured with two power supplies on a first side of the processing unit 705, and two power supplies on a second side that is about physically opposite to the first side. Mechanical constraints limit the allowable configurations of the power supplies (710, 712, 714, 716). For example, physical locations and/or limitations of a device (e.g., memory device, conductive channel, power rail, CPU, GPU, etc.) may limit the allowable configurations of the power supplies (710, 712, 714, 716). In another implementation, a printed circuit board may distribute power delivery among five or more power supplies that are positioned at any allowable physical location.

Advantageously, the disclosed approach improves efficiency of power delivery to a processing unit by physically distributing power phases around the processing unit. Accordingly, the present technology can help a manufacturer to reduce power that is dissipated in a printed circuit board. Reducing power dissipation enables, for example, a power supply (e.g., battery) to be more efficient and to provide energy to a processing unit over a longer period of time.

The invention has been described above with reference to specific implementations. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The claimed invention is:

1. A printed circuit board comprising:
a processing unit coupled to multiple power channels, including one or more first channels on a first side of the processing unit, and further including one or more second channels on a second side of the processing unit;
a first power supply disposed on a first side of the processing unit, coupled to the processing unit via the one or more first channels, and configured to supply half of a total current received by the processing unit; and
a second power supply disposed on a second side of the processing unit that is directly opposite to the first side, coupled to the processing unit via the one or more second channels, and configured to supply half of the total current received by the processing unit,
wherein the processing unit is configured to receive each half of the total current substantially simultaneously from the first power supply and the second power supply, and the processing unit is disposed directly between the first power supply and the second power supply.

2. The printed circuit board of claim 1, wherein the first power supply and the second power supply are configured to dissipate power in the printed circuit board that is less than a power that would be dissipated via a single power supply.

3. The printed circuit board of claim 1, wherein the multiple power channels further include one or more third channels on a third side of the processing unit, and wherein the printed circuit board further comprises a third power supply coupled to the processing unit via the one or more third channels.

4. The printed circuit board of claim 3, wherein the multiple power channels further include one or more fourth channels on a fourth side of the processing unit, and wherein the printed circuit board further comprises a fourth power supply coupled to the processing unit via the one or more fourth channels.

5. The printed circuit board of claim 1, wherein the printed circuit board is disposed within a mobile system that includes at least one of:
- a cell phone;
- a laptop;
- a tablet computer; or
- a handheld gaming device.

6. A distributed power supply for a processing unit on a printed circuit board, the distributed power supply comprising:
- multiple power channels coupled to the processing unit, wherein the multiple power channels include one or more first channels on a first side of the processing unit, and further include one or more second channels on a second side of the processing unit;
- a first power supply disposed on a first side of the processing unit, coupled to the processing unit via the one or more first channels, and configured to supply half of a total current received by the processing unit; and
- a second power supply disposed on a second side of the processing unit that is directly opposite to the first side, coupled to the processing unit via the one or more second channels, and configured to supply half of the total current received by the processing unit,
- wherein the processing unit is configured to receive each half of the total current substantially simultaneously from the first power supply and the second power supply, and the processing unit is disposed directly between the first power supply and the second power supply.

7. The distributed power supply of claim 6, wherein the first power supply and the second power supply include at least one of:
- a rechargeable battery;
- a non-rechargeable battery;
- a lithium ion battery;
- a lithium polymer battery;
- a nickel cadmium battery; or
- a nickel metal hydride battery.

8. The distributed power supply of claim 6, wherein the multiple power channels include conductive pathways etched from copper sheets laminated onto a non-conductive substrate of the printed circuit board.

9. The distributed power supply of claim 6, further comprising one or more additional power supplies coupled to the processing unit via the multiple power channels.

* * * * *